(12) United States Patent
Li

(10) Patent No.: US 7,839,593 B1
(45) Date of Patent: Nov. 23, 2010

(54) MAGNETO-RESISTIVE BIASING METHODS AND SYSTEMS

(75) Inventor: Kan Li, Singapore (SG)

(73) Assignee: Marvell International, Ltd., Hamilton (BM)

( * ) Notice: Subject to any disclaimer, the term of this patent is extended or adjusted under 35 U.S.C. 154(b) by 520 days.

(21) Appl. No.: 11/849,671

(22) Filed: Sep. 4, 2007

Related U.S. Application Data

(60) Provisional application No. 60/825,009, filed on Sep. 8, 2006.

(51) Int. Cl.
G11B 5/03 (2006.01)
(52) U.S. Cl. .......................................... 360/66; 360/67
(58) Field of Classification Search ........................ None
See application file for complete search history.

(56) References Cited

U.S. PATENT DOCUMENTS

| | | | |
|---|---|---|---|
| 6,222,415 B1 * | 4/2001 | Umeyama et al. ........... 330/252 |
| 6,909,569 B2 * | 6/2005 | Makita et al. ................. 360/66 |
| 6,947,238 B2 * | 9/2005 | Takayoshi et al. ............. 360/66 |
| 7,558,014 B1 * | 7/2009 | Voo et al. ...................... 360/67 |
| 2002/0181135 A1 * | 12/2002 | Takeuchi et al. .............. 360/66 |

FOREIGN PATENT DOCUMENTS

| | | |
|---|---|---|
| JP | 11007601 A * | 1/1999 |
| JP | 2002358603 A * | 12/2002 |

* cited by examiner

*Primary Examiner*—Jason C Olson

(57) ABSTRACT

A biasing device for a magneto-resistive element, including a first bias supply circuit coupled to the magneto-resistive element; and a first bias control circuit coupled to the first bias supply circuit, the first bias control circuit capable of controlling the first bias supply circuit to provide a first calibration mode bias signal during a calibration mode and a first operating mode bias signal during an operating mode, the first operating mode bias signal having a lower noise level than the first calibration mode bias signal.

37 Claims, 4 Drawing Sheets

MAGNETO-RESISTIVE BIASING METHODS AND SYSTEMS

INCORPORATION BY REFERENCE

This application claims priority under 35 U.S.C. §119(e) from U.S. Provisional Application Ser. No, 60/825,009 entitled "Regulator for MR Biasing Fast Settling and Low Thermal Noise," filed on Sep. 8, 2006, herein incorporated by reference in its entirety.

BACKGROUND

Magnetic recording systems, such as hard disk drives (HDDs), are the primary form of data storage and retrieval far most computer-based systems. In high capacity storage systems, magneto-resistive read sensors, commonly referred to as "MR sensors" or "MR heads," are commonly used in HDDs due to their ability to read data at higher track and linear densities than competing technologies.

MR sensors detect changing magnetic fields through a resistive change in their sensing layers (often referred to as their "MR elements") as a function of the strength and direction of magnetic flux passing through the sensing layer. MR elements tend to vary greatly in their resistances and sensitivities due to manufacturing variations and tolerances. The resistance of a single MR element may also change due to temperature or other conditions in the disk drive during manufacturing and use.

Unfortunately, the performance of an MR head is closely linked to a bias voltage applied to it, which may typically need to be around 150 millivolts and controlled to within a few millivolts tolerance. Still further, it is often advantageous to center such a bias voltage differentially to the ground level, and minimize noise in the bias voltage to improve performance.

SUMMARY OF THE DISCLOSURE

A biasing device for a MR element is disclosed that can include two bias supply circuits and a second bias supply circuit both coupled to the MR element. The first bias supply circuit can include a first transistor and a first programmable resistive element.

The biasing device can further include a first bias control circuit and a second bias control circuit. The first bias control circuit can be coupled to the first bias supply circuit, wherein the first bias control circuit is capable of controlling the first bias supply circuit to provide a first calibration mode bias signal during a calibration mode and a first operating mode bias signal during an operating mode. The first operating mode bias signal can have a lower noise level than the first calibration mode bias signal. Further, the first bias control circuit can include a first amplifier, a second transistor connected to an output of the first amplifier, and a second programmable resistive element connected to a channel terminal of the second transistor.

The biasing device can further include a first noise reduction circuit that is electrically connected between the first bias supply circuit and the first bias control circuit. The first noise reduction circuit can include a first low-pass filter and a first switch for enabling and disabling the first low-pass filter, wherein the first noise reduction circuit is enabled during the operating mode and disabled during the calibration mode.

The second bias supply circuit that is coupled to the MR element can similarly include a third transistor and a third programmable resistive element. Also, the biasing device can include a second bias control circuit coupled to the second bias supply circuit, wherein the second bias control circuit is capable of controlling the second bias supply circuit to provide a second calibration mode bias signal and a second operating mode bias signal. The second operating mode bias signal can have a lower noise level than the second calibration mode bias signal. The second bias control circuit can include a second amplifier, a fourth transistor connected to an output of the second amplifier, and a fourth programmable resistive element connected to a channel terminal of the fourth transistor.

The biasing device can also include a second noise reduction circuit that is electrically connected between the second bias supply circuit and the second bias control circuit. Like the first noise reduction circuit, the second noise reduction circuit can include a second low-pass filter and a second switch for enabling and disabling the second low-pass filter. The second noise reduction circuit can also be enabled during the operating mode and disabled during the calibration mode.

BRIEF DESCRIPTION OF THE DRAWINGS

The memory-related devices and methods are described with reference to the following figures, wherein like numerals reference like elements, and wherein.

DETAILED DESCRIPTION OF EMBODIMENTS

In the following descriptions, many of the exemplary circuits are shown to include n-channel metal-oxide-semiconductor field-effect transistors (MOSFETs) in a variety of configurations, While MOSFET devices are used by example, the disclosed circuits may be implemented using any number of other transistor types, such as J-FETs, bipolar transistors, and the like. Additionally, while n-channel devices are used in the following examples, the same general approaches may also apply to circuits incorporating p-channel FETs or PNP bipolar transistors, for example.

Still further, while the terms "drain" and "source" are used for ease of explanation and to adhere to traditional engineering usage, it should be recognized that a drain and source of a FET transistor may be considered interchangeable, and for the following descriptions merely thought of as a first end and a second end of a semiconductor channel unless otherwise stated or apparent to one of ordinary skill in the art.

Figure 1:
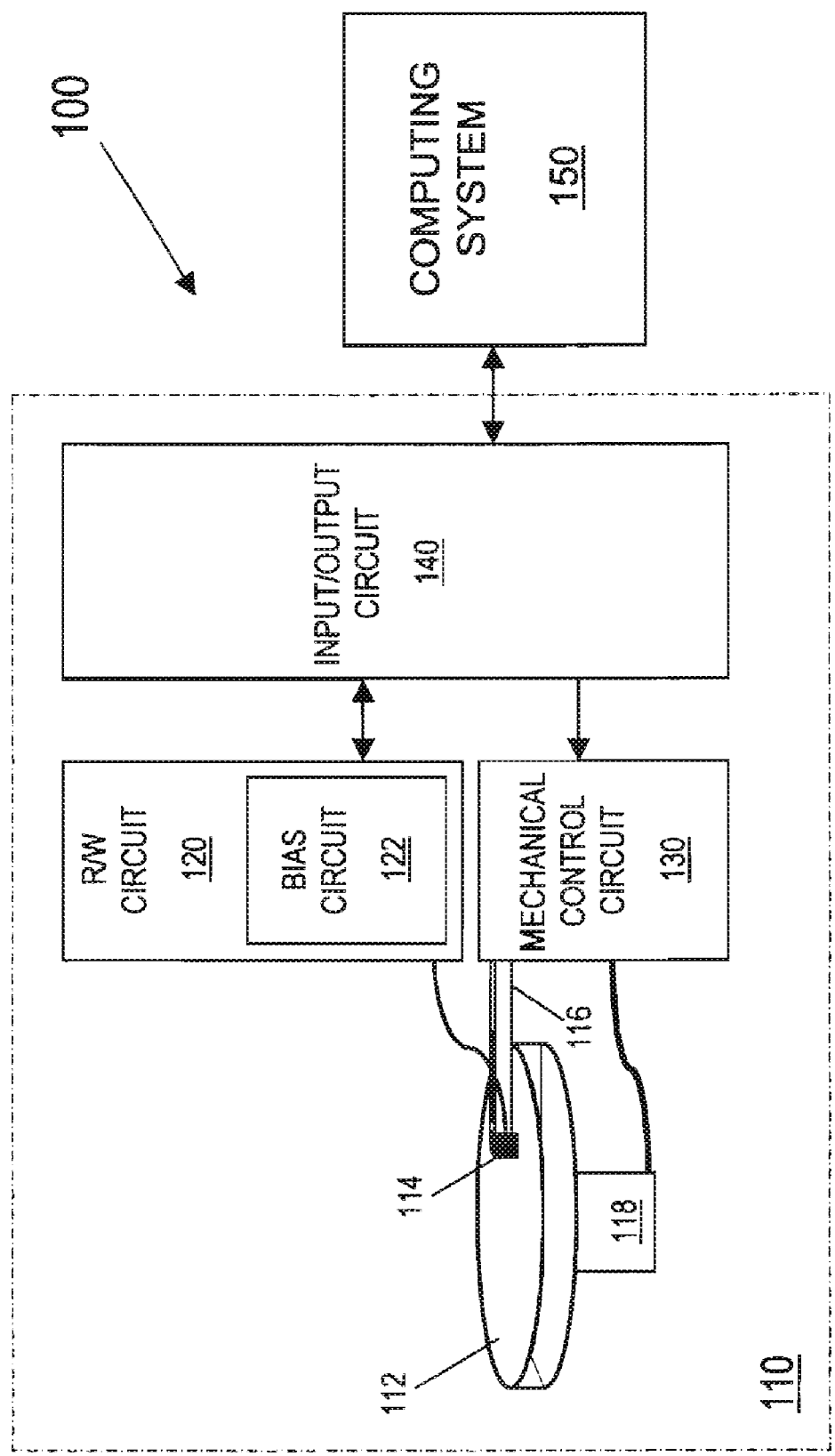
FIG. 1 is a block diagram of an exemplary data manipulation system.

FIG. 1 is a block diagram of an exemplary data manipulation system 100. As shown in FIG. 1, data manipulation system 100 includes a data storage system 110 and a computing system 150. The data storage system 110 includes a disk-shaped memory medium 112 spun by a motor 118 that may be written to and read from using transducer 114 held by armature 116. The data storage system 110 further includes a read/write circuit 120 coupled to transducer 114, a mechanical control circuit 130 coupled to both motor 118 and armature 116, and input/output circuit 140, Read/write circuit 120 may include a biasing circuit 122.

In operation, computing system 150 may store or retrieve data in data storage system 110 by any number of known or later developed commands and/or interface standards. For example, computing system 150 may retrieve data stored on memory medium 112 by issuing a command to input/output circuit 140 via a universal serial bus (USB). In response, input/output circuit 140 may cause mechanical control circuit 130 to move transducer 114 to a specific location on memory medium 112, and further cause read/write circuit 120 to extract and forward data sensed by transducer 114, which in turn may be passed to computing system 150.

In order to improve the performance of data storage system 110, as well as the data storage density of memory medium 112, it may be useful for biasing circuit 122 to compensate for resistive variations in a magneto-resistive (MR) element in transducer 114. As the performance of an MR head may be closely linked to the bias voltage applied to it, biasing circuit 122 may need to undergo a quick calibration to provide an appropriate well-regulated differential bias voltage of around 150 millivolts and controlled to within a few millivolts tolerance. Still further, once calibrated, biasing circuit 122 may need to minimize noise in its bias voltage to improve MR element performance and energy consumption.

Figure 2:
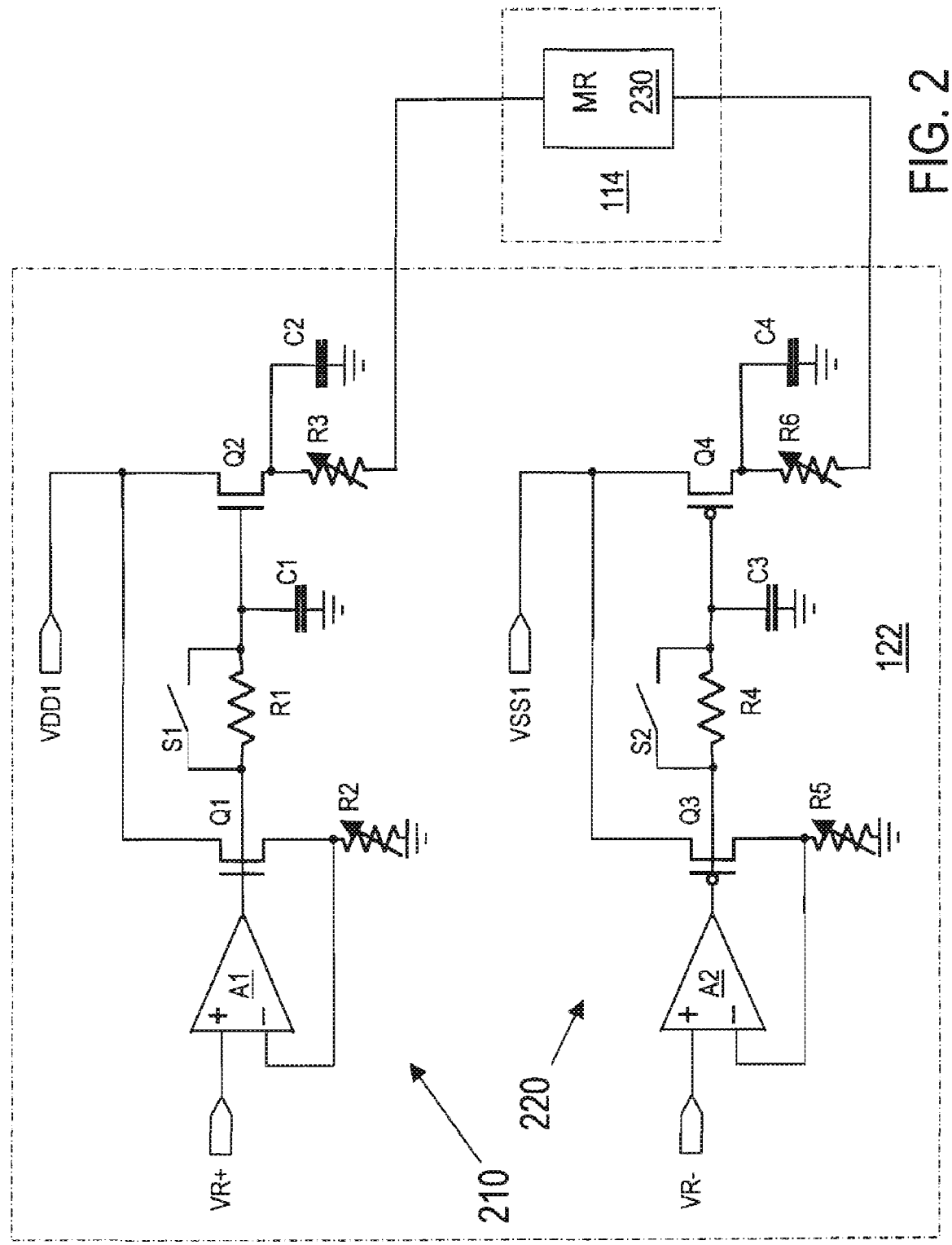
FIG. 2 is an exemplary MR biasing circuit.

FIG. 2 is an exemplary MR biasing circuit 122 usable with an MR element 230 located in transducer 114 of FIG. 1. As shown in FIG. 2, biasing circuit 122 includes a positive biasing circuit 210 fed by a positive regulated voltage VDD1 and a positive reference voltage VR+, and a negative biasing circuit 220 fed by a negative regulated voltage VSS1 and a negative reference voltage VR−. Positive biasing circuit 210 may be conceptually divided into a control portion, which includes amplifier A1, MOSFET Q1 and variable resistor R2; a switchable noise reduction portion, which includes resistor R1, capacitor C1 and switch S1; and a supply portion, which include MOSFET Q2, variable resistor R3 and capacitor C2. Negative biasing circuit 220 may be conceptually divided into a control portion, which includes amplifier A2, MOSFET Q3 and variable resistor R5; a switchable noise reduction portion, which includes resistor R4, capacitor C3 and switch S2; and a supply portion, which include MOSFET Q4, variable resistor R6 and capacitor C4.

Note that in various embodiments, positive biasing circuit 210 and negative biasing circuit 220 may be used independently to provide a single-ended supply voltage (positive or negative) to MR element 230, or otherwise used together to provide a differential biasing voltage across MR element 230. Given the similarity of positive biasing circuit 210 and negative biasing circuit 220, operational details of negative biasing circuit 220 will be omitted with the understanding that negative biasing circuit 220 may operate in a similar fashion to provide either a single-ended or differential supply voltage to MR element 230.

Assuming that positive supply voltage VDD1 and positive reference voltage VR+ are provided, positive biasing circuit 210 may start operation in a calibration mode. During calibration mode, switch S1 is closed, thus disabling the low-pass filter formed by resistor R1 and capacitor C1. By disabling this low-pass filter, the output voltage and current provided at the source of MOSFET Q2 may be quickly changed as compared to when switch S1 is opened. This may lead to substantially shortened calibration times and overall improved performance of any magnetic storage system incorporating positive biasing circuit 210.

During calibration, a controlling device (not shown in FIG. 2) may set variable resistors R2 and R3 to some preliminary value. Note that while for the exemplary embodiment variable resistors R2 and R3 may be identical and their resistances may be changed in an identical fashion, in other embodiments, especially in embodiments where MOSFET Q2 is larger than MOSFET Q1, variable resistors R2 and R3 may have different values and their instantaneous resistance values may be proportional, i.e., R2=K×R3 where K is a constant. Note that constant K may be representative of the size differences of MOSFETS Q1 and Q2. Also note that when MOSFET Q2 is larger than MOSFET Q1, overall current consumption of positive biasing circuit 210 may be reduced given the current mirror relationship of MOSFET Q2 to MOSFET Q1.

Once variable resistors R2 and R3 have been set to their preliminary values, MOSFET Q1 will change until the amount of current passing through its channel $I_{Q1}$ will cause the voltage at its source to equal VR+. That is, the channel current $I_{Q1}$ through MOSFET Q1 will be set to $I_{Q1}$=VR+/R2. Accordingly, the channel current $I_{Q2}$ of MOSFET Q2 will change proportionally, and the voltage provided to the upper terminal of MR element 230 will be a function of $I_{Q2}$ and the resistance value of variable resistor R3.

Next, some form of calibration testing may be performed to determine whether the voltage across MR element 230 and/or the current through MR element 230 is sufficient according to some predetermined criteria, e.g., according to some acceptable voltage range or using some performance criteria of MR element 230. Should positive biasing circuit 210 not be acceptably configured, the resistance values of variable resistors R2 and R3 may be suitably adjusted according to any number of algorithms or processes, whereupon the adjusted voltage and current signals to MR element 230 are adjusted and the system as a whole re-tested.

However, assuming that positive biasing circuit 210 is acceptably configured, switch S1 may be open and positive biasing circuit 210 may be used in its low-noise operational mode. That is, as it may not be necessary to further adjust positive biasing circuit 210, the propagation delay caused by resistor R1 and capacitor C1 may have no consequences. On the other hand, any thermal noise, power-supply noise or other noise present at the output of amplifier A1 may be substantially reduced by the low-pass filtering effect provided by resistor R1 and capacitor C1.

Figure 3:
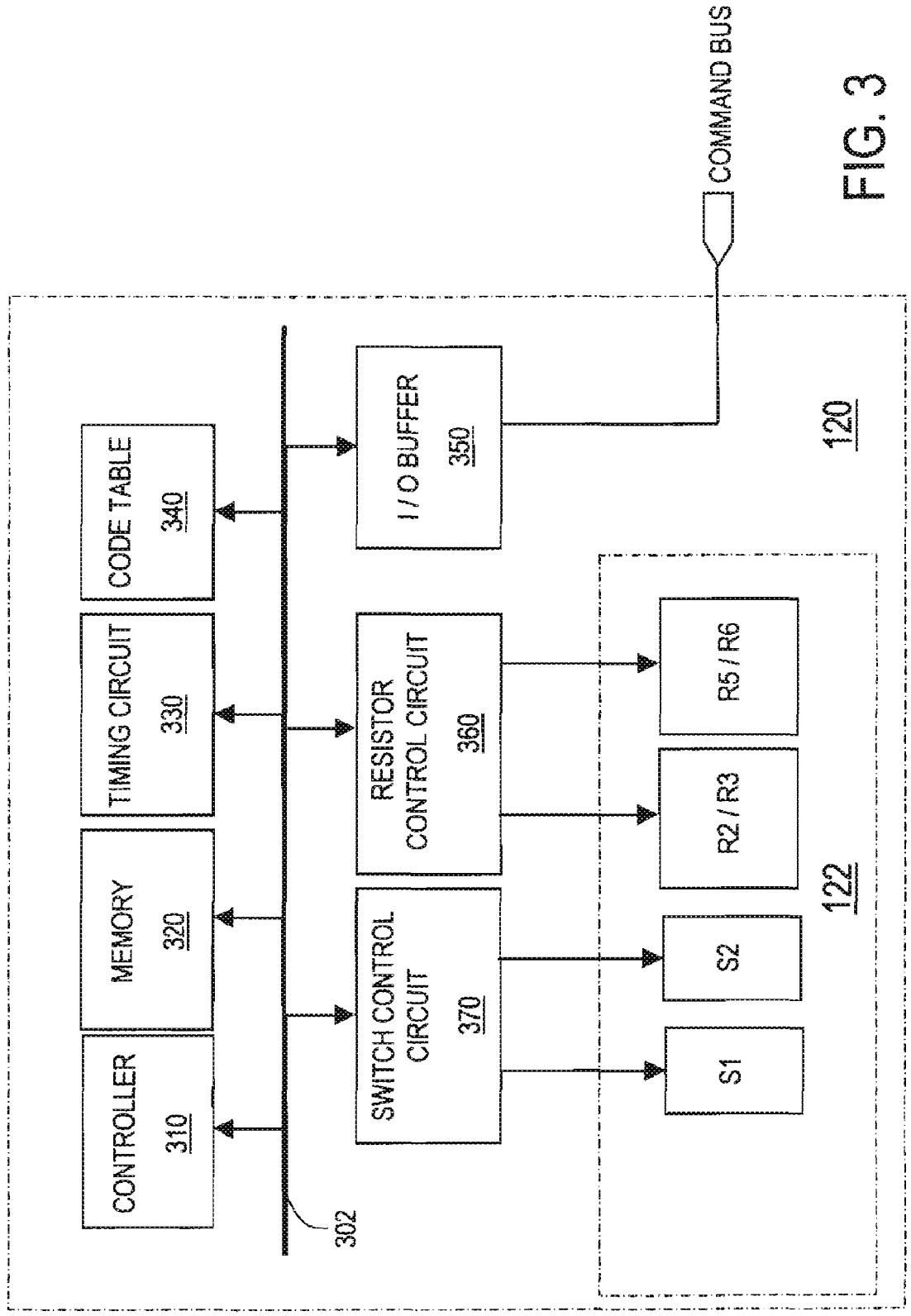
FIG. 3 is an exemplary control device for an MR biasing circuit.

FIG. 3 is a block diagram of an exemplary control device 120 for an MR biasing circuit. As shown in FIG. 3, read/write circuit 120 may include a controller 310, a memory 320, a timing circuit 330, a code table 340, an I/O buffer 350, a resistor control circuit 360 in communication with variable resistor pairs R2/R3 and R5/R6, and a switch control circuit 370 in communication with switches S1 and S2. The various components 310-370 are coupled by control/data bus 302.

Although the exemplary embodiment of read/write circuit 120 uses a bussed architecture, it should be appreciated that any other architecture may be used as is well known to those of ordinary skill in the art. For example, in various embodiments, components 310-370 may take the form of separate electronic components coupled together via a series of separate busses or specialized interfaces. It also should be appreciated that some of the above-listed components 330-340 may take the form of software/firmware routines residing in memory 320 to be executed by controller 310, or even software/firmware routines residing in separate memories to be executed by different controllers.

In operation and under control of controller 310, switches S1 and S2 may be closed to disable any noise reduction circuitry under their control, and resistor pairs R2/R3 and R5/R6 may be set to any number of values stored in code table 340. Note that the various codes in code table 340 may be representative of specific resistance values that variable resistors R2/R3 and R5/R6 may take.

Next, timing circuit 330 may be used to cause read/write circuit 120 to wait a predetermined time. Assuming that an adequate amount of time has passed, some form of calibration testing may be performed by some form of calibration circuitry (not shown), and read/write circuit 120 may receive further instructions (via I/O buffer 350) to either update the values of resistor pairs R2/R3 and R5/R6 and to continue calibration, or to end calibration by closing switches S1 and S2.

Figure 4:
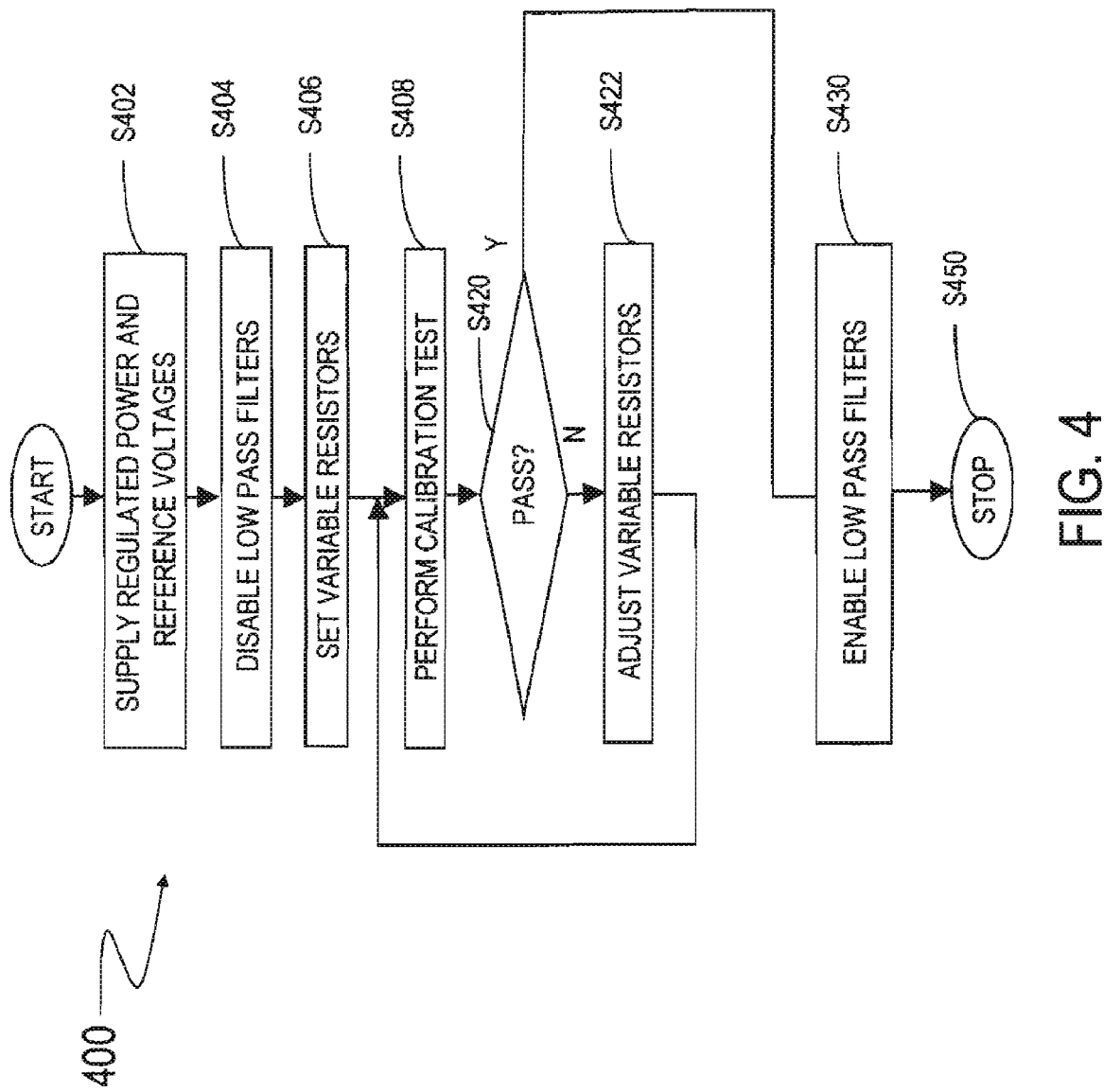
FIG. 4 is a flowchart outlining an exemplary process for biasing an MR element.

FIG. 4 is a flowchart outlining an exemplary process for biasing an MR element in a magnetic HDD or other data storage device. While the exemplary biasing process may establish a differential biasing signal, it should be appreciated that in various embodiments a single-ended (positive or negative) bias signal may be established as may be found necessary or otherwise advantageous. The process starts in step S402 where regulated positive and negative power supplies may be provided to an MR biasing circuit, such as VDD1 and VSS1 signals provided to circuit 122 shown in FIG. 2. Additionally, one or more reference signals may be provided to the biasing circuit, such as the VR+ and VR− signals provided to biasing circuit 122 shown in FIG. 2. Control continues to step S404.

In step S404, a low-pass filter (or other comparable noise reduction circuitry) embedded in the MR biasing circuit may be disabled. As described above, while disengaging/disabling such an low-pass filter may increase the ambient thermal noise generated by the MR biasing circuit, as well as increase power supply and other noise passed by the MR biasing circuit, that may contaminate the MR biasing signal, an advantage may be gained in that the MR biasing circuit may more quickly change its output MR biasing levels, which may substantially shorten the time needed for calibration. Control continues to step S406.

In step S406, two pairs of resistors, e.g., resistors R2/R3 and R5/R6 of FIG. 2, may be set to a first set of resistance values to establish a preliminary differential bias voltage across the MR element. Next, in step S408, some form of calibration test is performed to measure whether the preliminary differential bias voltage meets some established criteria, e.g., provides a bias voltage (or current) that optimizes performance or falls within some predetermined range. Then, in step S420, a determination is made as to whether the preliminary differential bias voltage passes the established criteria. If the preliminary differential bias voltage passes the established criteria, control jumps to step S430; otherwise, control continues to step S422.

In step S422, the resistance values of the resistors of step S406 are adjusted according to some predetermined algorithm or process, and control jumps back to step S408 where another calibration test is performed to measure whether the differential bias voltage established by the adjusted resistance values meets the established criteria.

In step S430, the low-pass filters of step S404 are enabled, thus lowering the noise of the differential bias voltage provided to the MR element, and control continues to step S450 where the process stops.

In various embodiments where the above-described systems and/or methods are implemented using a programmable device, such as a computer-based system or programmable logic, it should be appreciated that the above-described systems and methods can be implemented using any of various known or later developed programming languages, such as C, C++, FORTRAN, Pascal, VHDL and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions.

While the disclosed methods and systems have been described in conjunction with exemplary embodiments, these embodiments should be viewed as illustrative, not limiting. Various modifications, substitutes, or the like are possible within the spirit and scope of the disclosed methods and systems.

What is claimed is:

1. A biasing device for a magneto-resistive element, comprising:
   a first bias supply circuit coupled to the magneto-resistive element, the first bias supply circuit including a first programmable resistive element; and
   a first bias control circuit coupled to the first bias supply circuit, the first bias control circuit capable of controlling the first bias supply circuit to provide a first calibration mode bias signal during a calibration mode and a first operating mode bias signal during an operating mode, the first operating mode bias signal having a lower noise level than the first calibration mode bias signal.

2. The biasing device of claim 1, further comprising a first noise reduction circuit electrically connected between the first bias supply circuit and the first bias control circuit.

3. The biasing device of claim 2, wherein the first noise reduction circuit is enabled during the operating mode and disabled during the calibration mode.

4. The biasing device of claim 3, wherein the first noise reduction circuit is configured to reduce noise at the first bias control circuit from passing to the first bias supply circuit.

5. The biasing device of claim 4, wherein the first noise reduction circuit includes a low-pass filter.

6. The biasing device of claim 5, wherein the first noise reduction circuit further includes a first switching device configured to enable and disable the low-pass filter.

7. The biasing device of claim 1, wherein the first bias supply circuit includes a first current mirror.

8. The biasing device of claim 7, wherein the first current mirror includes a first transistor.

9. The biasing device of claim 1, wherein the first programmable resistive element is electrically connected to both the magneto-resistive element and to a channel terminal of a first transistor.

10. The biasing device of claim 9, further comprising a first noise reduction circuit electrically connected between the first bias supply circuit and the first bias control circuit.

11. The biasing device of claim 10, wherein the first noise reduction circuit is enabled during the operating mode and disabled during the calibration mode.

12. The biasing device of claim 11, wherein the first noise reduction circuit includes a low-pass filter and first switching device configured to enable and disable the low-pass filter.

13. The biasing device of claim 10, wherein the first bias control circuit includes a first programmable current source.

14. The biasing device of claim 13, wherein the first programmable current source includes a first amplifier, a second transistor connected to an output of the first amplifier, and a second programmable resistive element connected to a channel terminal of the second transistor.

15. The biasing device of claim 14, wherein the output of the first amplifier is coupled to a control terminal of the second transistor.

16. The biasing device of claim 15, wherein the first programmable resistive element and the second programmable resistive element are controlled in a way as to produce proportional resistance values at the same times.

17. The biasing device of claim 15, wherein the first programmable resistive element and the second programmable resistive element are controlled in a way as to produce substantially identical resistance values at the same times.

18. The biasing device of claim 1, further comprising:
    a second bias supply circuit coupled to the magneto-resistive element; and
    a second bias control circuit coupled to the second bias supply circuit, the second bias control circuit capable of controlling the second bias supply circuit to provide a second calibration mode bias signal and a second operating mode bias signal, the second operating mode bias signal having a lower noise level than the second calibration mode bias signal.

19. The biasing device of claim 18, wherein the first bias supply circuit and the second bias supply circuit provide a differential bias signal to the magneto-resistive element.

20. A magnetic disk drive incorporating the biasing device of claim 1.

21. A computing system incorporating the biasing device of claim 1.

22. A biasing device for a magneto-resistive element, comprising:
    a first bias supply circuit coupled to the magneto-resistive element, the first bias supply circuit including a first transistor and a first programmable resistive element;
    a first bias control circuit coupled to the first bias supply circuit, the first bias control circuit capable of controlling the first bias supply circuit to provide a first calibration mode bias signal during a calibration mode and a first operating mode bias signal during an operating mode, the first operating mode bias signal having a lower noise level than the first calibration mode bias signal, wherein the first bias control circuit includes a first amplifier, a second transistor connected to an output of the first amplifier, and a second programmable resistive element connected to a channel terminal of the second transistor;
    a first noise reduction circuit electrically connected between the first bias supply circuit and the first bias control circuit, the first noise reduction circuit including a first low-pass filter and a first switch for enabling and disabling the first low-pass filter, wherein the first noise reduction circuit is enabled during the operating mode and disabled during the calibration mode;
    a second bias supply circuit coupled to the magneto-resistive element, the second bias supply circuit including a third transistor and a third programmable resistive element;
    a second bias control circuit coupled to the second bias supply circuit, the second bias control circuit capable of controlling the second bias supply circuit to provide a second calibration mode bias signal and a second operating mode bias signal, the second operating mode bias signal having a lower noise level than the second calibration mode bias signal, wherein the second bias control circuit includes a second amplifier, a fourth transistor connected to an output of the second amplifier, and a fourth programmable resistive element connected to a channel terminal of the fourth transistor; and
    a second noise reduction circuit electrically connected between the second bias supply circuit and the second bias control circuit, the second noise reduction circuit including a second low-pass filter and a second switch for enabling and disabling the second low-pass filter, wherein the second noise reduction circuit is enabled during the operating mode and disabled during the calibration mode.

23. The biasing device of claim 22, wherein the first programmable resistive element and the second programmable resistive element are controlled in a way as to produce proportional resistance values at the same times.

24. The biasing device of claim 23, wherein the third programmable resistive element and the fourth programmable resistive element are controlled in a way as to produce proportional resistance values at the same times.

25. The biasing device of claim 24, wherein the first bias supply circuit and the second bias supply circuit provide a differential bias signal to the magneto-resistive element.

26. A device for reading magnetically coded information, comprising:
    a magneto-resistive element, coupled to a bias control circuit including a programmable resistive element; and
    a first biasing means for providing a first bias signal to a first terminal of the magneto-resistive element during a calibration mode and an operating mode, wherein the first bias signal has a lower noise during the operating mode than during the calibration mode.

27. The device of claim 26, further comprising a second biasing means for providing a second bias signal to a second terminal of the magneto-resistive element during the calibration mode and the operating mode, wherein the second bias signal has a lower noise during the operating mode than during the calibration mode.

28. The device of claim 26, wherein the first biasing means supplies a positive current to the magneto-resistive element.

29. The device of claim 26, wherein the first biasing means includes a supplying means for supplying the first bias signal to the magneto-resistive element.

30. The device of claim 29, wherein the first biasing means further includes a control means for controlling the supplying means.

31. The device of claim 30, wherein the first biasing means further includes a noise reduction means for lowering noise injected into the supplying means.

32. A method for biasing a magneto-resistive element, comprising:
    calibrating a first bias signal to establish a first bias signal level to the magneto-resistive element, wherein the calibrating includes setting a pair of resistive elements to a first pair of resistance values to establish a preliminary bias signal level; and
    engaging a noise reduction circuit to reduce an amount of noise in the first bias signal.

33. The method of claim 32, further comprising calibrating a second bias signal to establish a second bias signal level to the magneto-resistive element before the step of engaging the noise reduction circuit.

34. The method of claim 32, further comprising disengaging the noise reduction circuit prior to performing the calibrating step.

35. The method of claim 32, wherein the step of calibrating further includes determining whether the preliminary bias signal level is adequate; and setting the pair of resistive elements to a second pair of resistance values to establish a secondary bias signal level if the preliminary bias signal level is not adequate.

36. The method of claim 32, wherein the step of calibrating includes setting four resistive elements to a first set of resistance values to establish a preliminary differential bias signal level.

37. The method of claim 36, wherein the step of calibrating further includes determining whether the preliminary differential bias signal level is adequate; and setting the four resistive elements to a second set of resistance values to establish a secondary differential bias signal level if the preliminary differential bias signal level is not adequate.

* * * * *